United States Patent [19]

Neumann

[11] 4,447,723
[45] May 8, 1984

[54] SCANNING BEAM REFERENCE EMPLOYING A RETROREFLECTIVE CODE MEANS

[75] Inventor: Don B. Neumann, Laguna Beach, Calif.

[73] Assignee: Excellon Industries, Torrance, Calif.

[21] Appl. No.: 298,907

[22] Filed: Sep. 3, 1981

[51] Int. Cl.³ .............................................. H01J 3/14
[52] U.S. Cl. ............................. 250/236; 250/237 G; 358/293
[58] Field of Search ............................. 250/234–236, 250/237 R, 560, 231 SE, 216, 237 G; 350/6.5–6.8, 103–107; 235/487, 488, 494; 358/292, 293, 294, 290, 214

[56] References Cited

U.S. PATENT DOCUMENTS

| | | | |
|---|---|---|---|
| 3,744,915 | 7/1973 | Sick | 250/560 |
| 4,025,796 | 5/1977 | Erdmann | 250/237 R |
| 4,208,589 | 6/1980 | Dashwood et al. | 250/560 |
| 4,352,984 | 10/1982 | Ohara | 250/201 |

Primary Examiner—David C. Nelms
Attorney, Agent, or Firm—Gausewitz, Carr, Rothenberg & Edwards

[57] ABSTRACT

The laser beam of a flying spot scanner is turned on and off to write data under control of a reference clock that generates clock signals determined by the position of the writing beam. To detect position of the writing beam a reference beam is scanned in synchronism with the writing beam along and through a coding mask to a strip of retroreflective material fixed adjacent the mask. The reference beam is retroreflected through the mask back through the scanning optics to a fixed detector that produces an output determined by the scanning coded reference beam. Unwanted reflections from the mask surface are separated by tilting the mask.

18 Claims, 8 Drawing Figures

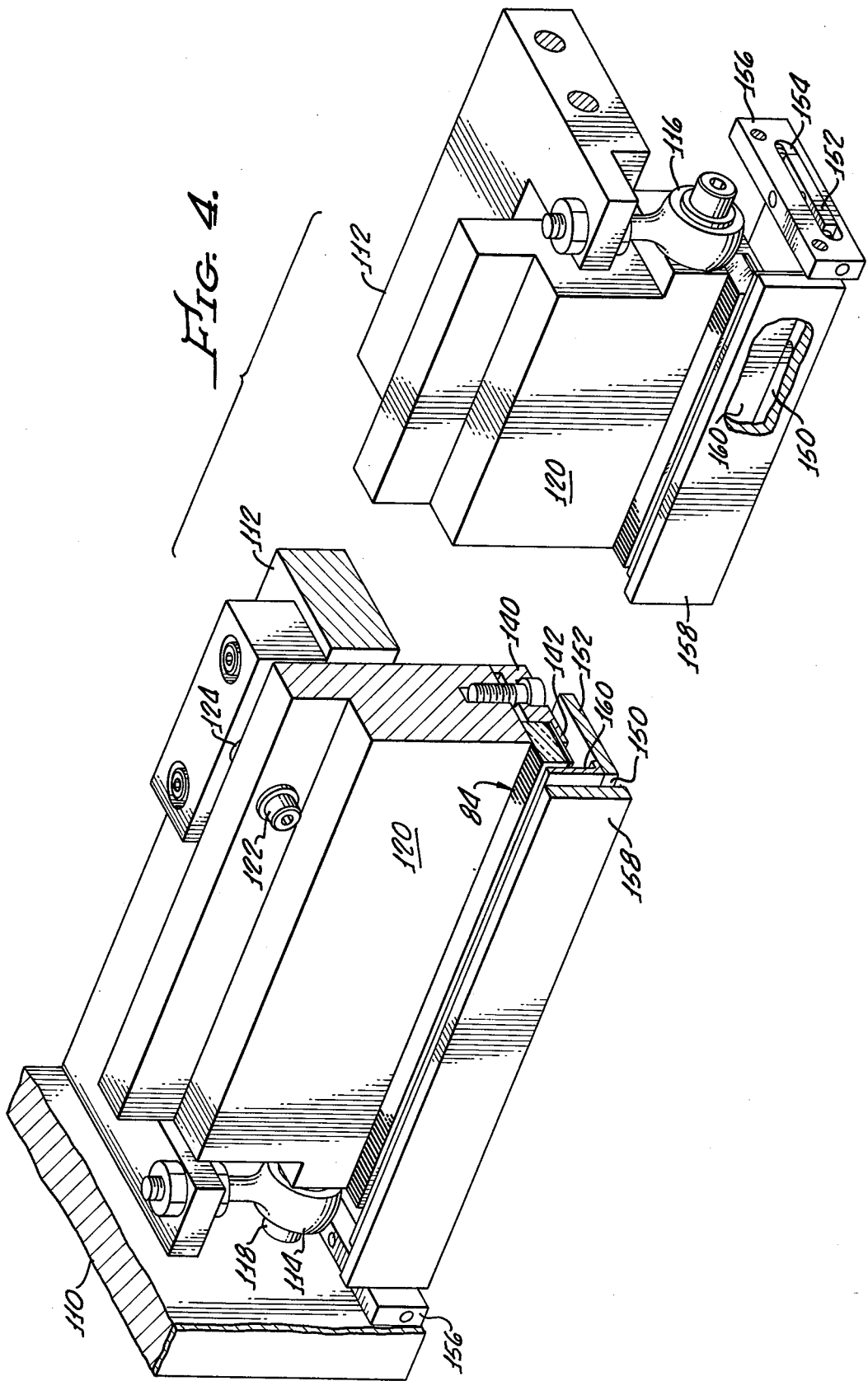

SCANNING BEAM REFERENCE EMPLOYING A RETROREFLECTIVE CODE MEANS

BACKGROUND OF THE INVENTION

The present invention relates to scanning beam writing and reading systems and more particularly concerns improved methods and apparatus for employing a coded reference beam to define position of the write or read beam in the course of its scan.

In the writing of data by means of a flying spot scanner, an energy beam such as a laser beam, is reflected from a scanning mirror to scan a write medium along a linear scan path that is caused to move transversely relative to the scan path. The energy beam is modulated, generally being turned on or off in accordance with data to be written and, thus, writes a desired data pattern by means of a succession of spots or dots. In order to know when to turn the energy beam on and off in the course of each line scan it is necessary to know the location of the beam. This can be done by sensing initiation of each scan line if scan velocity is linear. However, many types of scanning devices and their optical systems exhibit a nonlinear scan velocity. Thus, in many systems, the speed with which the writing spot traverses the write medium varies in the course of a single scan line. Therefore, the location of the beam on the write medium is not a fixed nor readily compensible function of time. Also, in some scanning systems nonlinearities may be so great as to introduce unacceptable intensity variations in the course of the scan.

To account for such nonlinearities, systems have been devised to sense the actual location of the write beam. This is frequently accomplished by causing a reference beam to scan a periodic mask in synchronism with the scan of the write beam across the write medium. Beam energy transmitted by the periodic mask is then detected and employed to develop a clock signal used to control modulation of the write beam.

In such reference beam systems problems are encountered in the collection of energy transmitted from the periodic mask. A scan line may be 18 inches in length, in some systems, and thus, a mask of similar dimensions is employed. Collection of light over such a distance has required the use of fiber optics or a Fresnel lens. Other arrangements have employed elliptical reflectors for reflecting energy from the mask to a detector at one focal point of the ellipse, the scanner being positioned at the other focal point. Such systems are cumbersome, bulky and expensive.

Accordingly, it is an object of the present invention to provide a simple and compact reference system that minimizes or avoids the above-mentioned problems.

SUMMARY OF THE INVENTION

In carrying out principles of the present invention in accordance with the preferred embodiment thereof, position of a scanning energy beam is detected by moving a reference beam in synchronism with the energy beam, modulating the reference beam according to its position, and retroreflecting the modulated reference beam for detection. According to a feature of the invention the reference beam is modulated by being passed through a code mask to impinge upon a relatively larger area of a retroreflective material adjacent the mask. Unwanted reflections from the mask surface are separated to attenuate or eliminate response of the detector thereto.

BRIEF DESCRIPTION OF THE DRAWINGS

FIG. 4 is a fragementary pictorial illustration with parts broken away showing structural details of code member and retroreflector;

DETAILED DESCRIPTION

The present invention is described herein as embodied in a laser writing system. Nevertheless, it will be readily understood that laser reading systems also use similar reference beams to provide a read beam position reference. Accordingly, the reference beam system described herein can readily be applied to such laser reading systems.

Figure 1:
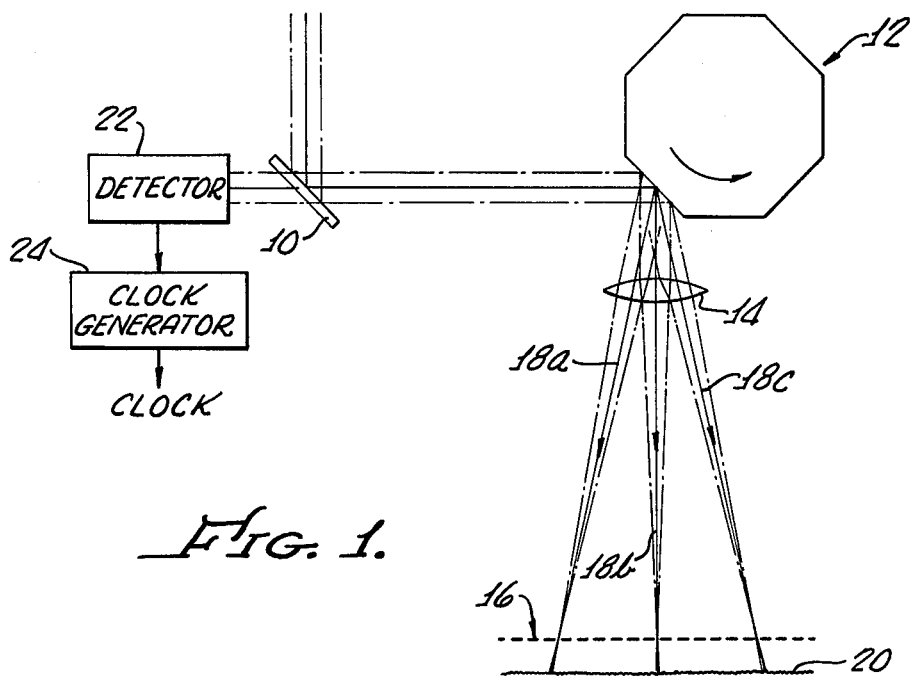
FIG. 1 schematically illustrates a scanning retroreflected reference beam.

Illustrated in FIG. 1 is a schematic representation of basic features of the reference system, omitting from this illustration elements of the write system that are not primarily involved in the reference generation. A suitably generated reference beam, such as the beam from a laser, is collimated and reflected from a beam splitter 10 to a scanning mirror 12, shown as an octagon having a reflective mirror on each of its eight surfaces and connected to be continuously rotated. The collimated reference beam is reflected from each surface of the polygonal scanning mirror in turn, being caused to make one complete linear scan by each scanning mirror surface, whereby the reference beam will linearly scan repetitively as mirror 12 rotates. The beam is directed from the scanning mirror through a focusing lens 14 to be focused upon the surface of a code member or apertured mask schematically indicated at 16. The mask comprises a series of alternating transparent and opaque areas so that as the beam is caused to scan (from left to right as seen in FIG. 1) it is chopped by the mask. Beam dimensions at its focal plane, the plane of the mask, in the direction of its scan are less than the width of any transparent area so that the beam may freely pass through a single mask aperture as it moves through positions indicated generally at 18a, 18b and 18c, in succession.

Fixedly positioned on the other side of mask 16, and spaced from the mask by a suitable distance, is a body of retroreflective material 20 that is coextensive with the mask. The material may be a commonly available strip having a reflective coating of the type that will reflect a major portion of incident energy back along the direction of incidence. Such material may be made by affixing spherical glass beads to a backing member in a suitable adhesive, leaving portions of the beads exposed. At each position of the beam wherein the projected or outgoing beam is not blocked by the mask but passes through a mask aperture, the beam is reflected back through the mask along the path of the incident beam. The retroreflected beam passes back to the scanning mirror, thence from the scanning mirror to the beam splitter 10, having been collected and collimated by the lens 14. The retroreflected energy passes through the beam splitter to an energy detector 22. The output of the detector is fed to a clock generator 24 which generates the desired reference clock that in effect defines the location of the write beam (not shown in FIG. 1) that scans in synchronism with the reference beam.

Figure 2:
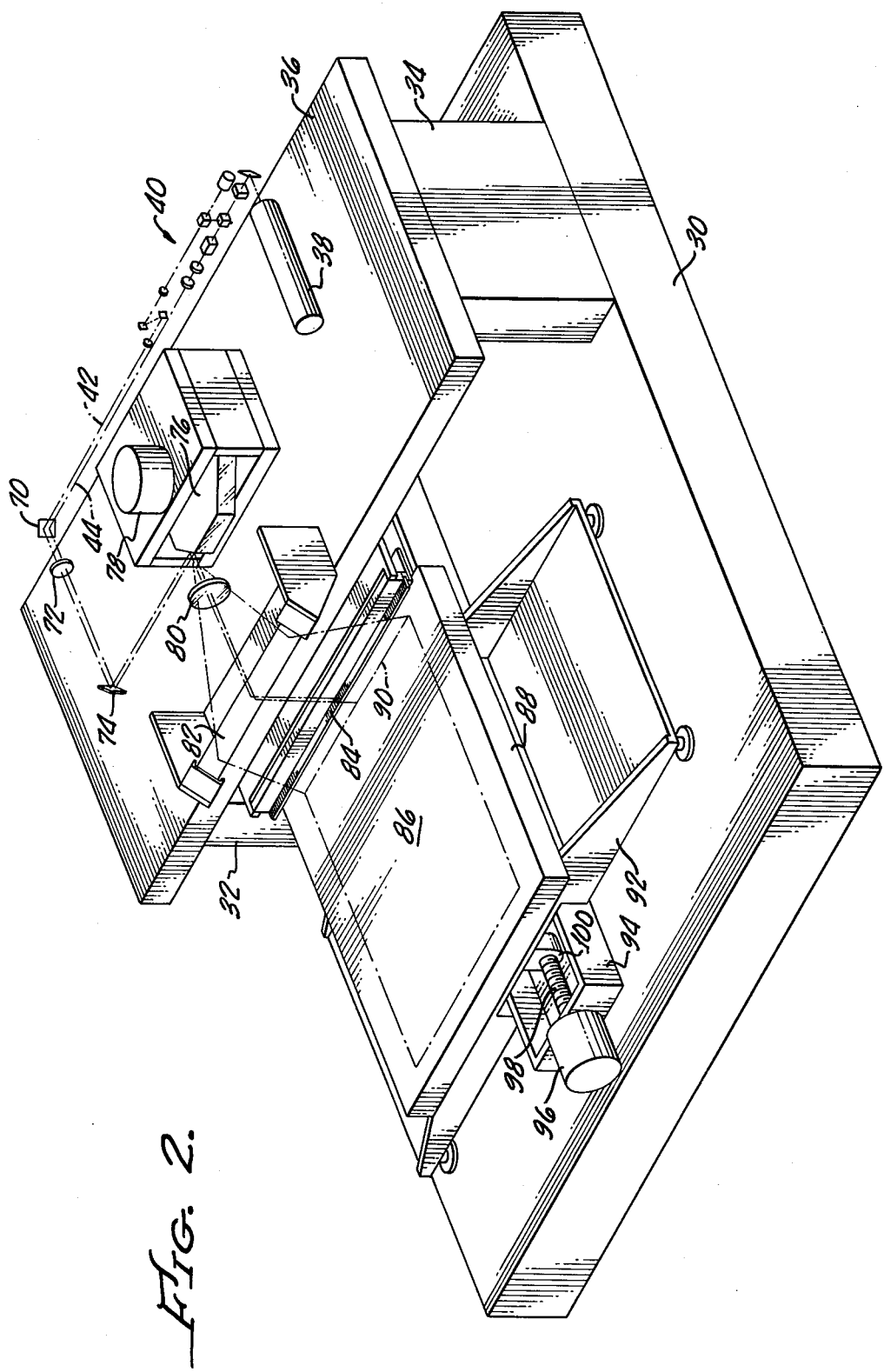
FIG. 2 is a simplified pictorial illustration of a laser flying spot scanner employing principles of the present invention.

Illustrated in FIG. 2 are fundamental features of a laser writing system embodying principles of the present invention.

A base 30 includes a pair of column structures 32, 34 carrying a scanner table 36 on which is mounted a laser 38 and an optical system 40 (shown inverted in FIG. 2) that generate a write beam 42 and a reference beam 44. The two beams may be mutually spaced in a vertical plane.

Figure 3:
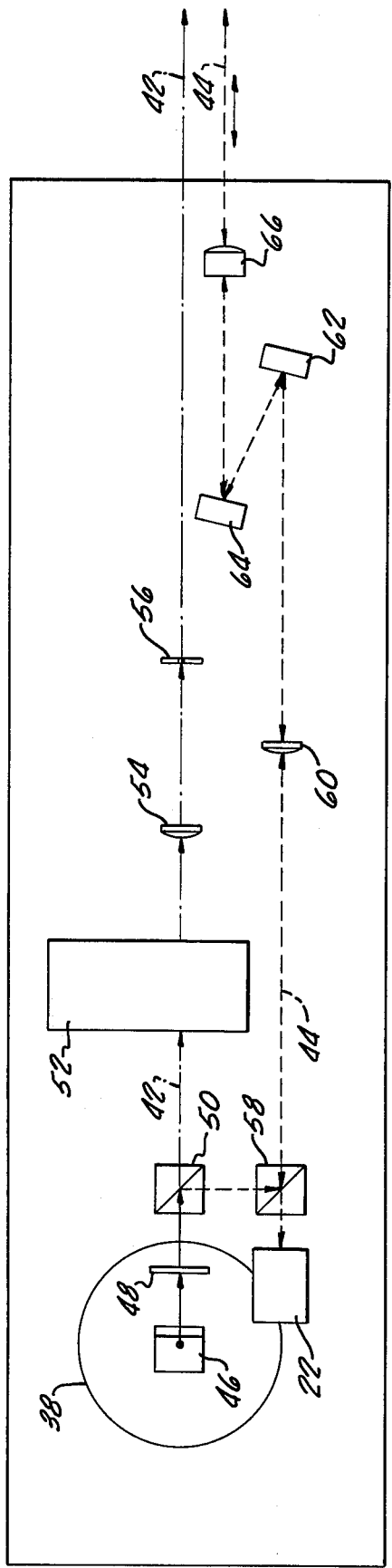
FIG. 3 schematically illustrates optical components for producing write and reference beams.

As shown in FIGS. 2 and 3, the beam from laser 38 is directed to a first turning mirror 46 and reflected therefrom through a half wave plate 48 and thence to a polarization sensitive beam splitter 50. From beam splitter 50 the write beam 42 passes through a conventional modulator 52 thence to a light beam spreading lens 54 that may, for example, increase beam diameter from 1 millimeter to 15 millimeters (at the polygonal scanning mirror to be described). The spread beam then, depending on the excitation of the modulator by a signal containing data to be written, is defracted and passes through the aperture of a modulator aperture plate 56, or, in the absence of a signal is completely blocked by the aperture plate.

The laser beam is reflected from beam splitter 50 to provide the reference beam which is directed to a second beam splitter 58 which turns the reference beam 44 to a direction substantially parallel with and spaced from the write beam. The reference beam passes through a reference beam spreading lens 60 and thence to a pair of beam path lengthening reflectors 62, 64 to a reference beam spreading and shaping cylindrical lens 66 that provides the reference beam with a chisel shape or elongated cross section.

The two beams are reflected from a turning mirror 70 through a collimating lens 72 to the second turning mirror 74 which directs the two to the reflective surfaces of a polygonal mirror 76 which is rotated at a constant speed by a motor 78. The write beam passes through the center of lens 72 without deflection but the lower reference beam is deflected upwardly as it passes through the lens below the lens center so that the two beams are substantially overlapped at the scanning mirror 76.

Both beams are reflected from each surface of the mirror 76 through a focusing objective lens 80 and complete their horizontal traverse at a horizontally elongated turning mirror 82. The structure described to this point is mounted upon the scanner support table 36.

In the illustrated exemplary embodiment the reference beam is inclined slightly upwardly to cross the write beam at the scan mirror surface whereby the reference beam will strike a higher portion of the turning mirror 82 and be reflected downwardly to a reference beam coding or modulating structure generally indicated at 84. The reference beam passes closer to the edge of the table 36. The write beam, on the other hand, strikes a lower portion of the turning mirror 82 and is reflected vertically downwardly along a path slightly further from the table 36 to impinge upon the write medium, which may be a suitable light sensitive emulsion 86 carried by a suitable substrate (not shown) upon a table 88. Rotation of the scanning mirror 76 causes the reference beam to scan substantially the full length of the reference coding assembly 84 in a fanning pattern that impinges thereon with varying angles of incidence, and also causes the write beam to traverse its linear scan path 90 across the surface of the write medium 86, also in a fan shaped pattern with varying angles of incidence.

The position of the scan line 90 and write medium 86 is moved for each successive scan by moving the write table 88 horizontally, in a direction perpendicular to the length of the scan line 90. To this end, table 88 is mounted upon a carriage 92 which is guided along a rail 94 mounted upon the system base 30. A motor 96 drives a lead screw 98 engaged with a nut 100 carried by the table 88 to move the table for successive scans.

It will be appreciated that specific details of the laser writing system are merely exemplary and many different systems may be employed having different write medium support and drive mechanisms, different optical systems, different types of scanning mirrors and different methods of reference beam generation. The write and reference beams may be parallel and displaced, or follow other separate paths to a common or synchronized scan mirror to insure synchronous scanning of the two beams. Alternatively, the write and reference beams may be of different colors, coincident, and separated by dichroic components.

The relative horizontal displacement of the final vertical legs of the reference and write beams in the described arrangements allows the coding assembly 84 to be horizontally displaced from the write beam scan line 90. To enable the write medium carrying table 88 to be driven longitudinally, perpendicular to the beam scans, the table is positioned slightly below the reference beam coding assembly 84 by a suitably small distance sufficient to provide clearance. The compact arrangement of the retroreflective coding assembly allows for a compact packaging of the system.

Figure 5:
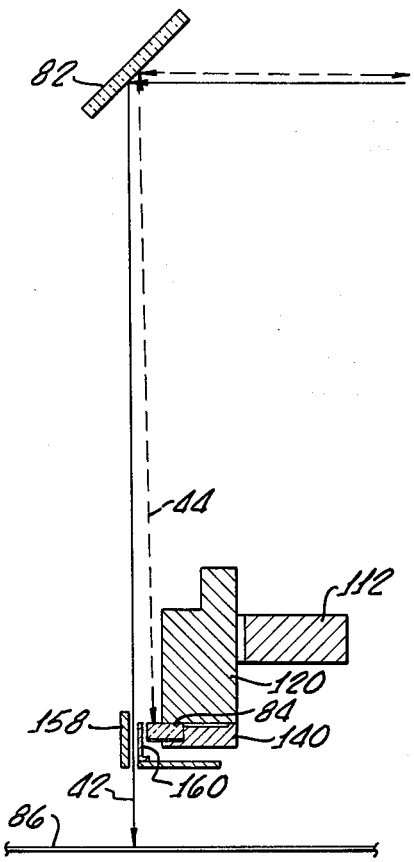
FIG. 5 is a fragementary sectional view illustrating the relation between the write and reference beams at the code member and retroreflector.

FIGS. 4 and 5 show further details of the apparatus that mounts the reference beam coding assembly and passes the write beam past this assembly in isolation therefrom.

Mounted to a wall 110 of the system (not shown in FIG. 2) is a fixed structural support 112 extending completely across and above the writing medium table 88. Journals 114, 116 are fixedly suspended from support 112 and pivotally carry a transversely extending shaft 118 that is fixed in a transversely extending support block 120. The angular position of block 120 may be adjusted by a spring urged bolt 122 extending through block 120 into threaded engagement with a nut 124 carried on the support 112.

Figure 6:
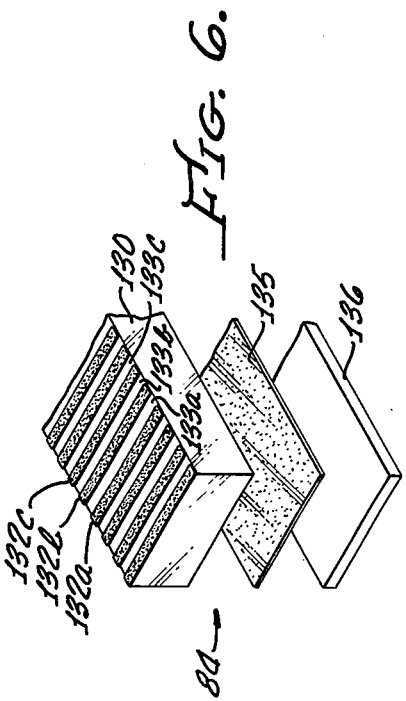
FIG. 6 is an exploded pictorial view of portions of the code member and retroreflector assembly.

The rigid elongated reference beam coding assembly 84 is fixedly mounted to the lower surface of support block 120. Coding assembly 84, as can be best seen in FIG. 6, is formed of a glass substrate 130, having a substantial thickness, and having one surface that carries a photographic emulsion in which the desired code pattern has been fixed. Although many different code patterns may be employed, it is presently preferred to form the code pattern of alternating opaque and transparent areas. Thus, the code pattern comprises a plurality of opaque transverse bars 132a, 132b, 132c, etc.

separated by clear spaces 133a, 133b and 133c, etc. The bars and spaces of the code pattern extend completely across the entire width of the transparent substrate and cover its entire length, alternating between opaque and transparent areas for the length of the substrate. The width of each bar and of each space (as measured in the direction of scanning) in a preferred embodiment are the same, each having a width of 5 mils, for example. Accordingly, a reference beam having a transversely elongated shape and being focused to a width or smallest dimension at the surface of the mask of about 1 to 2 mils can readily pass through any single mask space but will be chopped, being turned completely on or off, as the beam scans the length of the code member.

A strip of retroreflective material 135 is mounted to the lower surface of the transparent substrate 130, the surface opposite that which carries the mask. The retroreflective material 135 is a commonly available retroreflective strip such as projection screen material 7610 manufactured by Minnesota Mining and Manufacturing Co. It is held in place against the lower surface of the glass substrate by a relatively rigid plate 136.

A coding assembly clamping bar 140 (FIG. 4) is fixed to the lower edge of support block 120 and is longitudinally rabbeted or relieved to provide a forwardly projecting tongue or flange 142 that extends the full length of the clamp and is spaced from the lower surface of the support block. The coding assembly, including the glass substrate with its mask, the retroreflective strip 135 and holding plate 136 are all sandwiched together between flange 142 of clamp 140 and the lower edge of support block 120. A part of the coding assembly protrudes forwardly of block 120 for its full length. Thus, the coding assembly is rigidly positioned and yet projects for its full length forwardly of the front surface of support block 120 to receive the scanning reference beam.

In the use of a coding mask in this retroreflective system the opaque areas are preferably not only opaque but also absorptive so as to provide a minimum of reflection. Nevertheless, it is often desirable, in the manufacture of such a mask, to use processes and materials in which an opaque material having light reflective characteristics is etched or otherwise manipulated to provide alternating opaque and transparent areas. In such a mask the opaque areas themselves will be highly reflective at certain aspects. In addition, in certain aspects, the upwardly facing surface of the glass substrate (between adjacent opaque mask bars) may be highly reflective. Reflection from either the opaque areas or the glass substrate surface on which the mask is carried should not be transmitted to the reflector. The reference signal must be derived from the reference beam that has been modulated by the mask and reflected back through the system optics to the detector. Other reflections of the reference beam are not to be received by the detector. The detector desirably has no response to energy reflected from the mask surface.

If the coding assembly and, more particularly, the surface of the coding mask, were to be precisely perpendicular to the reference beam axis, the detector would receive an excessively and unacceptably large amount of reflected energy when the beam, during the intermediate portion of its scan along the mask, is substantially vertical (precisely or nearly precisely perpendicular to the surface of the mask). At such a position, and because reflection from the opaque mask areas and from the exposed glass surface is specular, these areas may act as a highly polished mirror and reflect a large quantity of light back along the optical path. When the beam is at or near outer ends of its scan these unwanted reflections from the opaque areas of the mask and from the glass substrate surface are directed away from the optical path and will not fall within the field of the detector.

Most conveniently the unwanted unmodulated reflection that could otherwise occur when the reference beam is perpendicular to the mask surface is separated from the modulated signal received by the reflector by simply pivotally shifting the entire coding assembly about the axis of shaft 18 (by operating adjustment bolt 122). The coding assembly is pivotally adjustable about the axis of the shaft 118, an axis that is parallel to the reference beam scan path. The angular shifting may be just a few degrees and need be only sufficient to insure that light reflected from the surface of the coding assembly when the reference beam is at the center of its scan is displaced by a distance great enough to cause the reflected (unmodulated) light to pass either above or below the upper or lower surface of the polygonal mirror. In other words, the coding assembly is simply tilted about an axis parallel to its length so that light reflected from its upper surface will not impinge upon the polygonal mirror. This tilting, of course, does not cause light from the retroreflected material to miss the mirror because the retroreflected light is always reflected back along the reference beam axis.

Write beam 42 (FIG. 5) passes closely adjacent the coding assembly (approximately one-quarter inch from the edge of the coding assembly in an exemplary embodiment). It is desirable that any stray light from the reference beam or other parts of the optical system be blocked from following the path of the write beam to the writing medium. For this purpose there is provided a write beam isolating slit 150 formed in the bottom of a horizontally extending plate 152 having its ends projecting outwardly for adjustable mounting in horizontally extending slots 154 of a pair of mounting blocks 156. Plate 152 carries an integral upstanding front wall 158 that extends vertically upwardly at the front side of slit 150. A rear wall 160 extends the length of the slit and projects upwardly at the rear edge of the slit to provide a narrow relatively deep passage for the scanning write beam so as to isolate the latter from stray light.

Figure 7:
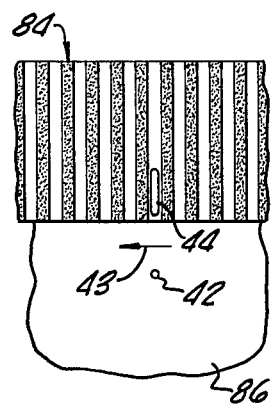
FIG. 7 is a plan view of a fragment of the code member.

As illustrated in FIG. 7, the write beam, indicated at 42, impinges upon the writing medium 86 slightly in front of the transversely elongated reference beam 44 and the two traverse their respective targets, the writing medium and the code member, (in the direction indicated by arrow 43) in precise synchronism with one another.

Figure 8:
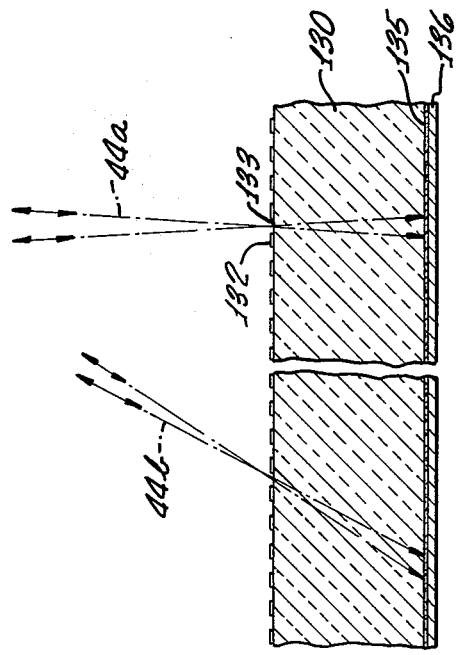
FIG. 8 is an enlarged sectional view of the code member and retroreflector assembly.

FIG. 8 illustrates the retroreflective action of the retroreflector strip 135, showing the reference beam at a position 44a adjacent a midpoint of its scan path and at a position 44b near an edge of the scan path. This figure illustrates that regardless of the angle of incidence of the reference beam, a majority of the energy of the beam is reflected back along the path of incidence, and, further that the beam impinges upon an area of the retroreflective material that is greater than the area of the beam at the mask.

It is important, as previously mentioned, that the reference beam have a narrow dimension at the mask member as it impinges on the mask and have a large dimension on the retroreflective strip. The beam has a narrow dimension to enable it to completely pass through a single mask aperture. It has a greater dimension at the retroreflective strip to insure illumination of an adequately sized area (a sufficient number of reflective beads) of the retroreflective material.

The thickness of the glass substrate spaces the retroreflective material from the mask and also helps to increase the beam dimension at the point of its impingement on the retroreflector. The narrow beam, focused to a dimension sufficient to enable it to readily pass through a single aperture of the mask upon incidence, is diverging as it leaves the mask to pass through the glass substrate. The glass thickness is sufficient to cause the reference beam to impinge upon the retroreflective strip over a greater area. Thus the desired increased area of illumination of the retroreflective material is achieved by either or both of (a) using long narrow mask apertures and a correspondingly shaped reference beam and (b) displacing the retroreflective material from the mask to allow it to diverge and enlarge before it impinges on the mask.

Part of the optics employed for the outgoing reference and write beams are also employed to control the path of the modulated reference beam which is fed back to the turning mirror 82, thence to the objective lens 80 for reflection from the scanning mirror 76 and through the other optical elements of the reference beam path to beam splitter 58 (FIG. 3) which passes the reflected beam to detector 22. In effect, scanning mirror 76 causes the field of view of the fixed detector to scan in synchronism with the scan of the write beam. The scanning detector field is always aimed at the same point in space (displaced by a small fixed distance) as the write beam. With a code member mask having opaque and transparent areas of 5 mils an exemplary system will generate one reference pulse for each 10 mils of scan travel. The clock generator 24 includes suitable electrical frequency multiplying circuitry to provide one pulse for each one mil of travel of the beams in their scan path, thus precisely locating the write beam for each 1 mil of its scan travel.

The foregoing detailed description is to be clearly understood as given by way of illustration and example only, the spirit and scope of this invention being limited solely by the appended claims.

What is claimed is:

1. In a scanning system wherein an energy beam is projected in a fan shaped scanning pattern and an outgoing reference beam is projected in synchronism with the energy beam in a fan shaped scanning pattern through a reference code member to impinge thereon with varying angles of incidence in the plane of the scanning pattern, an improved reference beam detecting system comprising
    a retroreflector positioned to receive said reference beam from said code member at varying incident angles and direct the beam back through the code member along the direction of incidence, and
    means for detecting said retroreflected reference beam after it has been reflected back through the code member.

2. The system of claim 1 including means for decreasing response of said detecting means to energy of said reference beam reflected from a surface of said code member.

3. The apparatus of claim 1 wherein said reference and energy beams are reflected from a scanning mirror and including means for directing said retroreflected reference beam back to said scanning mirror to be reflected therefrom, and including means for separating the retroreflected reference beam from the outgoing reference beam.

4. The system of claim 1 wherein said retroreflector comprises a plurality individually retroreflective elements for reflecting energy incident thereon at varying angles back along the direction of incidence.

5. The system of claim 1 wherein said retroreflector comprises a backing member having a plurality of glass beads thereon.

6. The system of claim 1 wherein said retroreflector comprises a plurality of individually retroreflective elements, said reference beam having an area at said retroreflector that is large enough to illuminate a plurality of said retroreflective elements.

7. The system of claim 6 including
    means for focussing said reference beam at said code member,
    said retroreflector being spaced from said code member whereby said reference beam increases in area as it propagates from said code member to said retroreflector to insure illumination of a plurality of said reflective elements.

8. The system of claim 1 wherein the reference code member is tilted about an axis parallel to the length of the reference beam scan direction whereby energy reflected from the code member is reflected at an angle to the referenced beam axis.

9. The system of claim 1 wherein said reference code member comprises a transparent substrate having a pattern of transparent and opaque areas on a first side thereof, and wherein said retroreflector comprises a backing member having a plurality of glass beads secured thereto, and means for securing said backing member to the other side with said substrate.

10. A writing system comprising
    means for generating a write energy beam,
    scanning means for causing the beam to scan in a fanning pattern to impinge upon a write medium with varying angles of incidence,
    means for transporting a write medium across said pattern, and
    reference means for defining location of the write beam as it scans, said reference means comprising
    means for generating a reference beam,
    a code member having a code pattern of transparent and opaque areas,
    scanning means for causing the reference beam to scan in a fanning pattern to impinge upon said code member with varying angles of incidence in the plane of the fanning pattern,
    a retroreflective member secured to said code member and receiving energy of said reference beam projected through said code member at varying angles of incidence in the plane of the fanning pattern, said retroreflective member including means for retroreflecting energy incident thereon back along the direction of incidence, said means for retroreflecting comprising a plurality of discrete retroreflective elements, each being retroreflective of energy incident thereon along varying angles of incidence and each having a size less than the area of said retroreflective member that is illuminated by the reference beam projected through said code member, whereby the beam passing through said code member illuminates a plurality of said retroreflective elements, and
    means for detecting energy reflected from said retroreflective elements.

11. A scanning system comprising
means for generating first and second beams, said second beam being a reference beam,
a scanning mirror,
means for directing said beams to said scanning mirror for reflection therefrom along outgoing optical paths that scan in angularly divergent fanning patterns,
a medium, said first beam optical path moving in a scan path across said medium,
means for moving said medium relative to said scan path,
retroreflective code means for receiving said reference beam at varying angles of incidence in the plane of one of said fanning patterns and for modulating said reference beam and retroreflecting the modulated reference beam back along the direction of incidence,
said retroreflective code means comprising a transparent code member and a plurality of retroreflective elements secured thereto for retroreflecting energy passing through said code member,
means for separating said reference beam retroreflected by said retroreflective elements from the reference beam projected from said mirror to said code means and reflected by said code member, thereby to provide a separated retroreflected reference beam having decreased reflections from said code member, and
means for detecting said separated retroreflected reference beam.

12. The system of claim 11 wherein said code member comprises a transparent substrate having first and second opposite surfaces and a code pattern of transparent and opaque areas on said first surface, said retroreflective elements being positioned at said second surface.

13. The system of claim 12 wherein said reference beam is focused on an area of said code member having a relatively small dimension and passes through said code member and said substrate to illuminate a relatively large area of said retroreflector having a plurality of said retroreflective elements.

14. The system of claim 12 wherein said code pattern areas and the cross section of said reference beam are elongated in a direction transverse to said reference beam scan path, whereby a relatively large number of said retroreflective elements are illuminated by said reference beam for enhanced retroreflection.

15. The system of claim 13 wherein said pattern comprises a series of alternating transparent and opaque bars, each having a length greater than the distance between adjacent transparent or opaque bars, said reference beam having a first dimension that allows it to pass through one of said transparent bars and having a second dimension considerably greater than said first dimension.

16. The system of claim 15 including a fixed support bar, a reference hanger block adjustably carried by said support bar, said code member and retroreflective elements being fixed to said hanger block, and means for adjusting said hanger block to cause energy reflected from said code member to pass said scanning mirror.

17. The system of claim 16 wherein said code member and retroreflective elements are positioned adjacent the scan path of said first beam, and including means positioned in the path of said first beam and adjacent said code member for blocking stray light from said first beam path.

18. The system of claim 17 wherein said means for blocking comprises a slit member in said first beam scan path having a narrow, elongated aperture for passing said first beam and first and second wall members upstanding from opposite sides of said aperture.

* * * * *